US012639439B2

(12) United States Patent　　　　(10) Patent No.: US 12,639,439 B2
Palanki et al.　　　　　　　　　　　　(45) Date of Patent:　　May 26, 2026

(54) DISTRIBUTED LEDGER-BASED HYBRID QUANTUM MACHINE LEARNING RANSOMWARE SECURITY

(71) Applicant: American Express Travel Related Services Company, Inc., New York, NY (US)

(72) Inventors: Hiranmayi Palanki, Tampa, FL (US); John Thomas Hancock, III, Deerfield Beach, FL (US)

(73) Assignee: American Express Travel Related Services Company, Inc., New York, NY (US)

( * ) Notice: Subject to any disclaimer, the term of this patent is extended or adjusted under 35 U.S.C. 154(b) by 23 days.

(21) Appl. No.: 18/775,530

(22) Filed: Jul. 17, 2024

(65) Prior Publication Data

US 2026/0023851 A1　　Jan. 22, 2026

(51) Int. Cl.
　　*G06F 21/56*　　　　(2013.01)
　　*G06F 11/1446*　　　(2026.01)
　　*G06F 21/60*　　　　(2013.01)
　　*G06N 3/0464*　　　(2023.01)
　　*G06N 10/20*　　　　(2022.01)

(52) U.S. Cl.
　　CPC ........ *G06F 21/566* (2013.01); *G06F 11/1451* (2013.01); *G06F 21/602* (2013.01); *G06N 3/0464* (2023.01); *G06N 10/20* (2022.01); *G06F 2221/034* (2013.01)

(58) Field of Classification Search
　　CPC .................................................... G06F 21/566
　　See application file for complete search history.

(56) References Cited

U.S. PATENT DOCUMENTS

| | | | | |
|---|---|---|---|---|
| 11,580,218 | B2 * | 2/2023 | Salem | G06F 21/566 |
| 12,462,028 | B2 * | 11/2025 | Kumar | G06F 21/554 |
| 2018/0248896 | A1 * | 8/2018 | Challita | G06F 21/554 |
| 2019/0007434 | A1 * | 1/2019 | McLane | H04L 63/1425 |
| 2019/0138722 | A1 * | 5/2019 | Krcál | G06F 21/562 |
| 2019/0251251 | A1 * | 8/2019 | Carson | G06F 21/561 |
| 2019/0384911 | A1 * | 12/2019 | Caspi | G06N 3/045 |
| 2021/0044603 | A1 * | 2/2021 | Annen | H04L 63/1416 |
| 2021/0044604 | A1 * | 2/2021 | Annen | G06F 11/1435 |
| 2024/0232352 | A1 * | 7/2024 | Mariappan | G06F 21/602 |

* cited by examiner

*Primary Examiner* — Simon P Kanaan
(74) *Attorney, Agent, or Firm* — Thomas Horstemeyer, LLP

(57) ABSTRACT

Disclosed are various approaches for distributed ledger-based hybrid quantum ransomware security. In some examples, ransomware detection can be performed on a file. The ransomware detection can include converting the file into image data comprising an image data format, processing the image data using a convolutional neural network to generate a feature map, and providing the feature map to a variational quantum circuit machine learning engine. An action can be performed based at least in part on an output from the variational quantum circuit machine learning engine.

18 Claims, 7 Drawing Sheets

115

130

START

Identify a Backup Criterion ~ 603

Retrieve Prioritized Backup Data ~ 606

Perform Hybrid Quantum Ransomware Detection On Prioritized Backup Data ~ 609

Store Prioritized Backup Data in Distributed Ledger ~ 612

END

130

START

Request for Data Restoration ~ 703

Retrieve Prioritized Backup Data
from Distributed Ledger ~ 706

Perform Hybrid Quantum Ransomware Detection
On Prioritized Backup Data (if Detection Updated) ~ 709

Restore Backup Data to Client Device
and/or Production Environment ~ 712

END

DISTRIBUTED LEDGER-BASED HYBRID QUANTUM MACHINE LEARNING RANSOMWARE SECURITY

BACKGROUND

Ransomware attacks continue to be a predominant cyber security threat with increasing levels of sophistication by threat actors. Ransomware attacks can include scareware, screen lock ransomware, encrypting ransomware, and other types of malicious software. Any of these ransomware attacks may result in a demand for payments to remove or stop their illicit activity. However, there is no guarantee that payment will result in an unlocked system and decrypted files. Furthermore, the system can still be compromised even if access to the system is regained or granted by the attackers.

If sensitive information is compromised, the enterprise can suffer serious reputational damage. Even if an enterprise has a data backup system, even data backup systems can be compromised and altered by ransomware. As a result, solutions that are limited to recovery from a ransomware attack using traditional data backups can be insufficient. Detecting ransomware, and recovery from ransomware attacks can also be a time-consuming process. Identification of ransomware in files can utilize a large amount of compute power and time.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
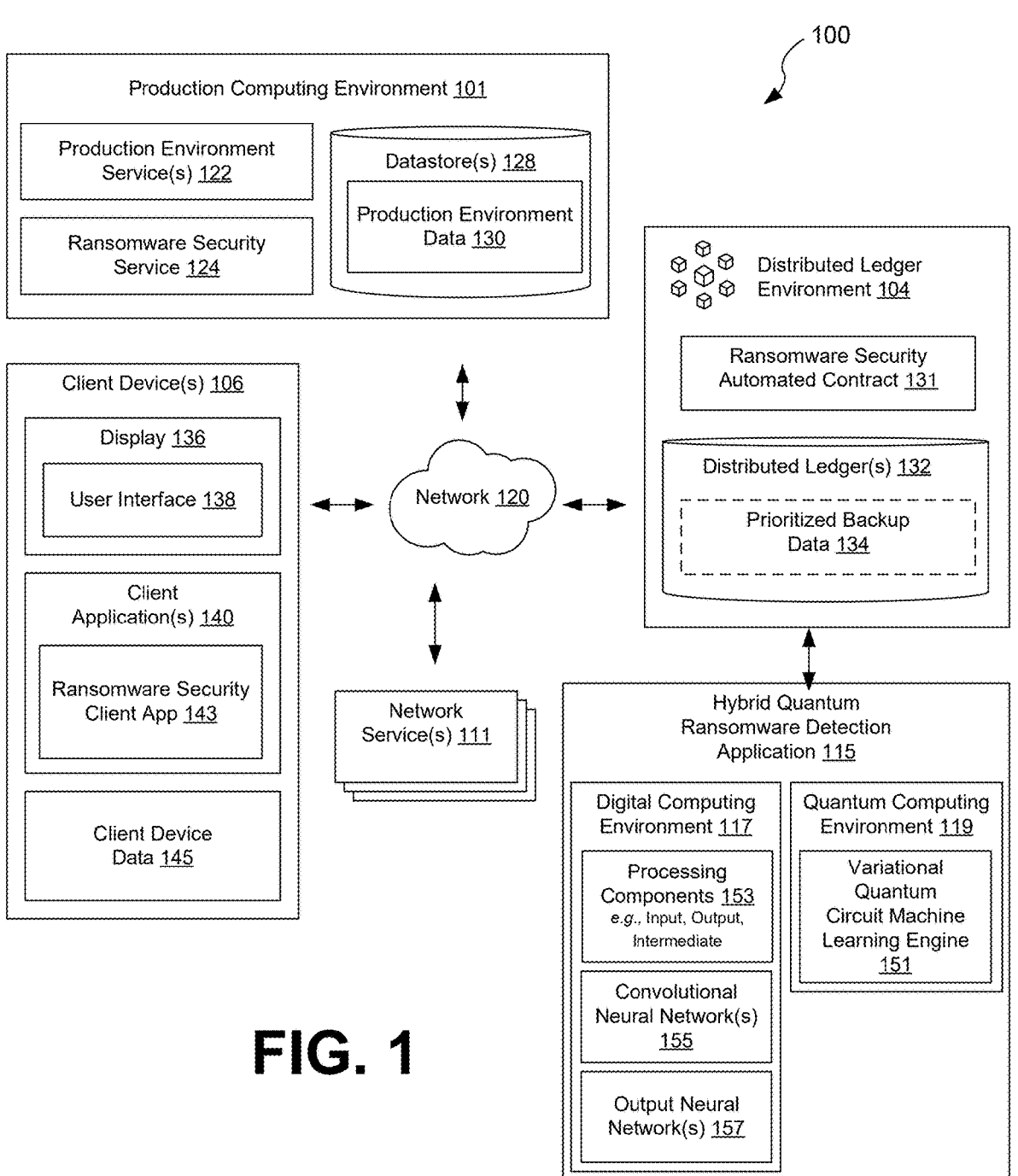
FIG. 1 is a drawing of a networked environment that includes components that provide distributed ledger-based hybrid quantum machine learning ransomware security according to various embodiments of the present disclosure.

Disclosed are various approaches for distributed ledger-based hybrid quantum ransomware security. Ransomware attacks continue to be a predominant cyber security threat with increasing levels of sophistication by threat actors. Ransomware attacks can include scareware, screen lock ransomware, encrypting ransomware, and other types of malicious software. Scareware can refer to ransomware that incorrectly states that a problem such as a virus is affecting your computer, and requests payment to remove the malady through minimally intrusive messages. Screen lock ransomware can lock your interface and/or input devices and demand payment. Encrypting ransomware can encrypt your data in association with a demand for payment. When dealing with ransomware, there is no guarantee that payment will result in an unlocked system and decrypted files. Furthermore, the system can still be compromised even if access to the system is regained by payment, causing further concern.

If sensitive information is compromised, an enterprise can suffer serious reputational damage even if system and data access is regained. Even if an enterprise has data backup, data backup systems can be compromised and altered. As a result, solutions that are limited to recovery from a ransomware attack using traditional data backups can be insufficient. Detecting ransomware, and recovery from ransomware attacks can also be a time-consuming process. Identification of ransomware in files can utilize a large amount of compute power and time.

The mechanisms described in the present disclosure can provide an immutable and efficient distributed ledger (e.g., a blockchain) record for prioritized backup data, and can further provide a hybrid quantum machine learning system that utilizes classical (digital) and quantum computing to more quickly identify and respond to ransomware. In addition, a distributed agent (e.g., a smart contract) on a distributed ledger can coordinate communications with, a hybrid quantum machine learning (e.g., neural network) ransomware security application that includes traditional and quantum computing environments. The distributed agents or smart contracts can refer to bytecode deployed and executed in a distributed ledger environment. The components in the distributed ledger environment can define triggers for data backup to the distributed ledger and restoration of data from the distributed ledger, which provides an immutable restoration record.

In this context, embodiments can achieve certain improvements and advantages over traditional technologies. For example, various embodiments of the present disclosure can improve the functioning of computer systems and networks, by increasing efficiency, and reducing power consumption and network bandwidth usage over other systems by backing up data that is limited to data indicated as system-critical or otherwise prioritized. As another example, various embodiments of the present disclosure can improve the functioning of computer systems improving or increasing the speed at which ransomware can be identified by using quantum computing environments that include variational quantum circuits that provide at least a portion of the machine learning components that identify ransomware. As another example, various embodiments of the present disclosure can improve the functioning of computer systems by limiting ransomware scans to files received from external sources, for example outside of one or more subnets, which is more efficient compared to some approaches. As another example, various embodiments of the present disclosure can improve the functioning of computer systems by limiting ransomware scans to files that correspond to file types and/or data types that can include ransomware executables, which is more efficient compared to some approaches. As another example, various embodiments of the present disclosure can improve the functioning of computer systems by automatedly performing the various ransomware detection, data backup, and data restoration actions according to a smart contract executed using a distributed ledger or blockchain environment, which is more efficient compared to some approaches. As another example, various embodiments of the present disclosure can improve the functioning of computer systems by storing prioritized backup data in an immutable distributed ledger or blockchain, which is more reliable and resilient compared to other storage options for similar solutions. In some of these examples, potential ransomware file data can be converted to floating-point arrays and/or image data such as bitmap data, which allows the ransomware file data to be processed using the hybrid quantum ransomware detection application for improved speed and efficiency.

In the following discussion, a general description of the components of distributed ledger-based hybrid quantum ransomware security are provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

With reference to FIG. 1, shown is a networked environment 100 according to various embodiments. The networked environment 100 can include a production computing environment 101, a distributed ledger environment 104, client devices 106, network services 111, and a hybrid quantum ransomware detection application 115 that is executed at least partially using a classical digital computing environment 117 and at least partially using a quantum computing environment 119. The components of the networked environment 100 can be in data communication with each other via a network 120. Although depicted and described separately, any one or more of the network services 111 and the distributed ledger environment 104 can operate as a component executed using the production computing environment 101 in various embodiments of the present disclosure. For example, at least one node of the distributed ledger environment 104 can be provided using the production computing environment 101 in various embodiments.

The network 120 can include wide area networks (WANs), local area networks (LANs), personal area networks (PANs), or any combination thereof. These networks can include wired or wireless components or any combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 120 can also include a combination of two or more networks 120. Examples of networks 120 can include the Internet, intranets, extranets, virtual private networks (VPNs), and similar networks.

The production computing environment 101 can include one or more computing devices that include a processor, a memory, and/or a network interface. For example, the computing devices can be configured to perform computations on behalf of other computing devices or applications. As another example, such computing devices can host and/or provide content to other computing devices based at least in part on requests for content. The production computing environment 101 can provide an execution environment for production environment services 122, a ransomware security service 124, and other executable instructions.

Various data is stored in a datastore 128 that is accessible to the production computing environment 101. The datastore 128 can be representative of a plurality of datastores 128, which can include relational databases or non-relational databases such as object-oriented databases, hierarchical databases, hash tables or similar key-value datastores, as well as other data storage applications or data structures. Moreover, combinations of these databases, data storage applications, and/or data structures can be used together to provide a single, logical, datastore. The data stored in the datastore 128 is associated with the operation of the various applications or functional entities described below. The data is stored in a datastore 128 can include production environment data 130 as well as the executable instructions including the production environment services 122 and the ransomware security service 124.

Moreover, the production computing environment 101 can employ a plurality of computing devices that can be arranged in one or more server banks or computer banks or other arrangements. Such computing devices can be located in a single installation or can be distributed among many different geographical locations. For example, the production computing environment 101 can include a plurality of computing devices that together can include a hosted computing resource, a grid computing resource, or any other distributed computing arrangement. In some cases, the production computing environment 101 can correspond to an elastic computing resource where the allotted capacity of processing, network, storage, or other computing-related resources can vary over time. Various applications or other functionality can be executed in the production computing environment 101. The components executed on the production computing environment 101 include other applications, services, processes, systems, engines, and functionality not discussed in detail herein.

The production computing environment 101 can provide software and other functionalities using physical devices within a local area network. The production environment services 122 can provide client devices 106 with local and remote access to production environment data 130 and software functionalities using Virtual Desktop Infrastructure (VDI) and Desktop as a Service (DaaS) to provide virtualized desktops, Software as a Service (SaaS) to provide access to software services, and Unified Endpoint Management (UEM) to manage application platforms, infrastructure, and endpoint devices. The production environment services 122 can also include identity and access management services that provide user- and device-specific access to the functions of the production computing environment 101. The production environment services 122 can also provide users and client devices 106 with authentication services to access and authenticate with network services 111. In some examples, the identity and access management services can provide access to authentication for resources provided using the production computing environment 101 and network services 111. In this context, the network services 111 can include services that provide VDI, DaaS, SaaS, UEM, and other services as authenticated using the identity and access management services of the production computing environment 101.

The ransomware security service 124 can provide for ransomware security of the production computing environment 101 in association with the hybrid quantum ransomware detection application 115 and the ransomware security automated contract 131. The ransomware security client application 143 can provide for ransomware security of the client device 106 in association with the hybrid quantum ransomware detection application 115 and the ransomware security automated contract 131. The ransomware security service 124 can scan a predetermined subset of the files, memory locations including datastores 128, and production environment services 122 on the production computing environment 101 as specified in the ransomware security automated contract 131. The subset of files, memory locations, and services (or applications) that are specified to be scanned can change periodically based at least in part on developing ransomware threats identified by a network service 111. The subset of files, memory locations, and services that are specified to be scanned can also be updated based at least in part on administrative user selections through a user interface of the ransomware security automated contract 131 or an associated distributed application, which is provided to administrate certain aspects of protection that are specified as selectable or modifiable.

The distributed ledger environment 104 can refer to a decentralized network of computing devices or nodes that communicate using peer-to-peer network communications. The nodes of the distributed ledger environment 104 can provide and adhere to a consensus mechanism that validates and records transactions against a blockchain or another distributed ledger. The distributed ledger environment 104 can support distributed agents that are executed as distributed processes according to an agreed on and predetermined set of rules.

The ransomware security automated contract 131 can refer to a distributed application and/or smart contract executed as a distributed process using the distributed ledger environment 104. The ransomware security automated contract 131 can provide the production computing environment 101 and the client devices 106 with ransomware security services according to a predetermined set of rules according to a contract or other agreement. The ransomware security automated contract 131 can be stored in a distributed ledger 132 and executed using the distributed ledger environment 104. The ransomware security automated contract 131 can use a distributed ledger 132 to immutably store prioritized backup data 134, which can include a prioritized subset of the production environment services 122, production environment data 130, client applications 140, and client device data 145. The ransomware security automated contract 131 can use the hybrid quantum ransomware detection application 115 to identify ransomware embodied or otherwise included in files transmitted, transferred, generated, or identified in the production computing environment 101 and the client devices 106.

The prioritized backup data 134 can include data that corresponds to a predetermined specification that indicate types of data, data locations, and other characteristics of the prioritized backup data 134. While the discussion indicates that prioritized backup data 134 can include various items, it can be understood that in some, but not all, examples the prioritized backup data 134 can be limited to the indicated data. Prioritized backup data 134 can include cryptographic data and/or data stored in a data location that includes cryptographic data such as a cryptographic keychain or keyring. Prioritized backup data 134 can include data that backs up a hardware cryptographic device or component of a device, and/or a network location of the hardware cryptographic device or component of a device.

Prioritized backup data 134 can include an operating system and a predetermined subset of the client applications 140 of the client device 106. Prioritized backup data 134 can include a subset of data stored in the client device 106 corresponding to a predetermined subset of the production environment services 122. Prioritized backup data 134 can include operating systems and a predetermined subset of the production environment services 122. Prioritized backup data 134 can include a subset of the production environment data 130 corresponding to the predetermined subset of the production environment services 122. Prioritized backup data 134 can include data, services, and executables that are indicated to be system critical by respective operating systems of the client device 106 and the production computing environment 101. Prioritized backup data 134 can include user-selected data indicated as prioritized based at least in part on user selection. Prioritized backup data 134 can include deployment configuration data including a set of rules and conditions used during a deployment to a production computing environment 101 or a cloud computing environment utilized by the production computing environment 101. Deployment can refer to actions that install, configure, and update software to make it available to users.

The client device 106 is representative of a plurality of client devices 106 that can be coupled to the network 120. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 136, such as liquid crystal displays (LCDs), gas plasma-based flat panel displays, organic light emitting diode (OLED) displays, electrophoretic ink ("E-ink") displays, projectors, or other types of display devices. In some instances, the displays 136 can be a component of the client device 106 or can be connected to the client device 106 through a wired or wireless connection.

The client device 106 can execute various applications such as a client application 160 or other applications. The client application 160 can be executed in a client device 106 to access network content served up by the production computing environment 101, the distributed ledger environment 104, and other servers, thereby rendering a user interface 138 on the displays 136. To this end, the client application 160 can include a browser, a dedicated application, or other executable, and the user interface 138 can include a network page, an application screen, or other user mechanism for obtaining user input.

The client device 106 can execute client applications 160 such as the ransomware security client application 143, browser applications, chat applications, messaging applications, email applications, social networking applications, word processors, spreadsheets, or other applications. The client device 106 can use the client applications 160 to access VDI, DaaS, SaaS, UEM, and other services of the production computing environment 101 and the network services 111. In some examples, the various services of the production computing environment 101 and the network services 111 can be accessed using an identity and access management services of the production computing environment 101.

The ransomware security client application 143 can provide for ransomware security of the client device 106 in association with the hybrid quantum ransomware detection application 115 and the ransomware security automated contract 131. The ransomware security client application 143 can scan a predetermined subset of the files, memory locations, and applications on the client application 143 as specified in the ransomware security automated contract 131. The subset of files, memory locations, and applications that are specified to be scanned can change periodically based at least in part on developing ransomware threats identified by a network service 111. The subset of files, memory locations, and applications that are specified to be scanned can also be updated based at least in part on administrative user selections through a user interface of the ransomware security automated contract 131 or an associated distributed application, which is provided to administrate certain aspects of protection that are specified as selectable or modifiable.

The network services 111 can also include services such as a cyber threat service or other threat intelligence service that can identify new types of ransomware and other cyber threats. A network service 111 can identify emerging ransomware threats, vulnerabilities, and attack techniques, including an indication of file names and file types that can include ransomware. In some examples, the network service 111 can provide a copy of the ransomware itself for testing and identification purposes. In some examples, the network services 111 can also provide one or more of the digital computing environment 117 and the quantum computing environment 119.

The hybrid quantum ransomware detection application 115 can be executed at least partially using the digital computing environment 117 and/or at least partially using the quantum computing environment 119. The machine learning components of the digital computing environment 117 such as the convolutional neural network 155 and the output neural network 157 can be considered 'digital machine learning components.' The machine learning components of the quantum computing environment 119 such as the variational quantum circuit machine learning engine 151 can be considered 'quantum machine learning components.' The digital machine learning components and the quantum machine learning components can form a 'hybrid quantum machine learning engine' of the hybrid quantum ransomware detection application 115.

The digital computing environment 117 can be referred to as "classical," "digital-based," or "bit-based" since its computing architecture performs bit-based operations using bits that maintain a single, binary state at a given time for information storage and manipulation. The software executed using the digital computing environment 117 can also be referred to as "classical," "digital," or "bit-based," and can use bit-based operations. The bit can be considered a basic unit of information in classical digital computing and digital communications. The bit can be maintained based at least in part on voltage or charge, with a low voltage or charge representing a value of zero ("0") and a high voltage or charge representing a value of one ("1").

By contrast, the quantum computing environment 119 can be referred to as a "quantum-based" or "qubit-based" computing architecture that performs operations using quantum bits or qubits that can represent multiple states at a given time for information storage and manipulation. The software executed using quantum computing environment 119 can also be referred to as "quantum-based," or "qubit-based," and can use qubit-based operations. The qubit can be considered a basic unit of information in quantum computing and quantum communications. The qubit can be maintained based at least in part on the spin of electron or polarization of a photon. As a result, the digital computing environment 117 can also be referred to as a classical or digital computing environment by contrast with the quantum computing environment 119, even if the quantum computing environment 119 can use some level of digital computing for user interfaces, data storage, network interfaces, and so on.

The digital computing environment 117 can include one or more computing devices that include a processor, a memory, and/or a network interface. For example, the computing devices can be configured to perform computations on behalf of other computing devices or applications. As another example, such computing devices can host and/or provide content to other computing devices based at least in part on requests for content. The digital computing environment 117 can provide an environment for the processing components 153, the convolutional neural networks 155, the output neural networks 157, and other executable instructions.

The digital computing environment 117 can employ a plurality of computing devices that can be arranged in one or more server banks or computer banks or other arrangements. Such computing devices can be located in a single installation or can be distributed among many different geographical locations. For example, the digital computing environment 117 can include a plurality of computing devices that together can include a hosted computing resource, a grid computing resource or any other distributed computing arrangement. In some cases, the digital computing environment 117 can correspond to an elastic computing resource where the allotted capacity of processing, network, storage, or other computing-related resources can vary over time. Various applications or other functionality can be executed in the digital computing environment 117.

The variational quantum circuit machine learning engine 151 can include quantum-based machine learning functions that can identify ransomware in preprocessed data that is preprocessed and received from the digital computing environment 117 components of the hybrid quantum ransomware detection application 115. The preprocessed data can include an output of the convolutional neural network or networks 155. A file such as an executable file that can be converted to image data such as a bitmap file, fed to the convolutional neural network or networks 155, and an output of the convolutional neural network or networks 155 can be referred to as preprocessed file data that is provided as input values for the variational quantum circuit machine learning engine 151.

The processing components 153 can include input processing components that receive a file for testing and convert it to image data for and provide it as input to the convolutional neural networks 155. The convolutional neural networks 155 can include a number of layers such as an input layer, one or more convolutional layers, an activation function layer, pooling layers, fully connected layers, an output layer, and other layers. The convolutional neural networks 155 can detect patterns and features in the image data from the file under test. The convolutional neural networks 155 can identify "edges," "textures," and other "visual" features in the image data from an executable or other file under test. While the features can be referred to as "visual" features, these visual features refer to the data that has been converted into image data for the purpose of feature extraction to identify similarities with "ground truth" ransomware files that are used to train the variational quantum circuit machine learning engine 151 to detect ransomware. In some examples the ground truth ransomware files are also used to train at least a portion of the output neural networks 157.

The output neural networks 157 can take the output of the variational quantum circuit machine learning engine 151 as an input and can convert the output of the variational quantum circuit machine learning engine 151 to a probability value that indicates a probability that the file under test includes ransomware. The term output neural network is provided as a distinction from the convolutional neural networks 155. However, the output neural networks 157 can include convolutional layers as well as other types of layers. Since output neural networks 157 can provide at least one probability value that indicates whether the file under test includes ransomware, the layers of the output neural networks 157 can include a softmax activation function layer, or another activation function layer that provides a probability value as the activation layer output.

A final layer of the output neural networks 157 can convert the probability value to a Boolean output that can indicate whether the file under test includes ransomware. Alternatively, the processing components 153 can include output rules that convert the probability to a Boolean output. For example, the output rules can indicate a threshold probability value. If the probability value is greater than (or equal to) the threshold probability value, then the Boolean output can indicate that the file under test includes ransomware. Otherwise, the Boolean output can indicate that ransomware is undetected in the file, or the file under test does not include ransomware.

Figure 2:
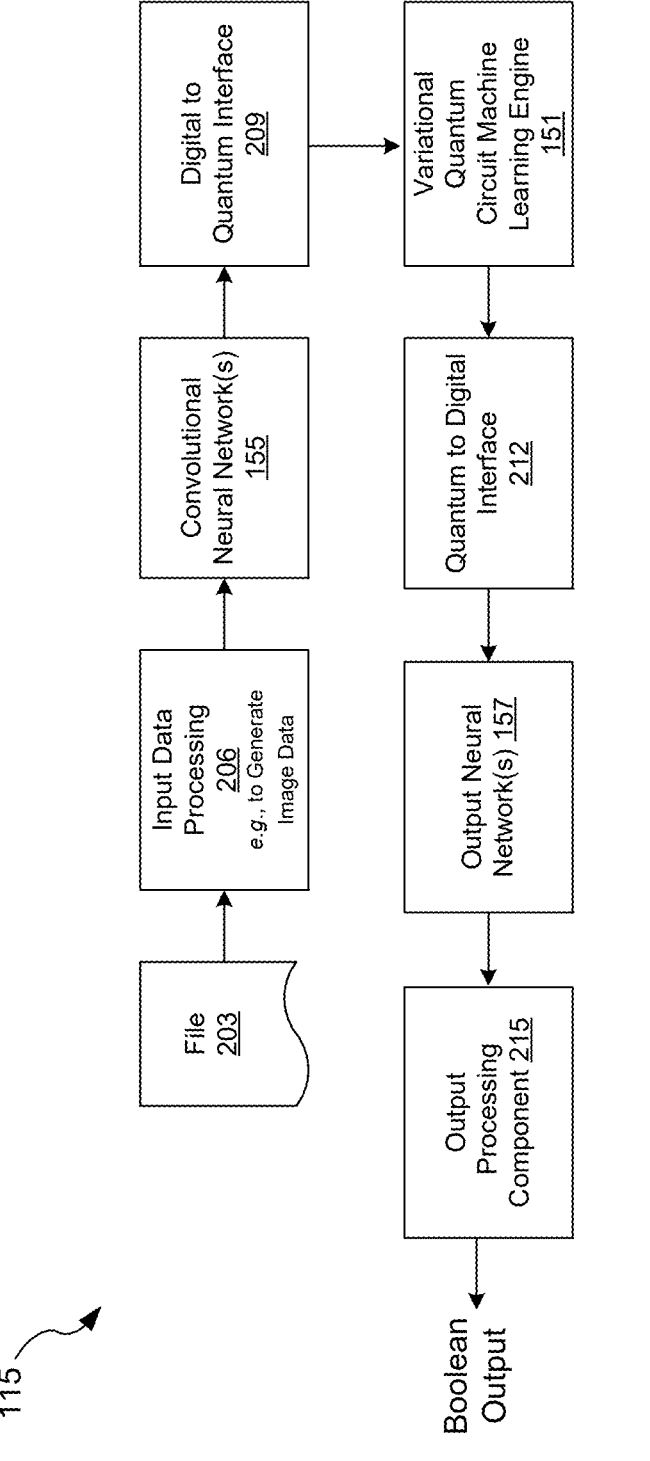
FIG. 2 is a drawing illustrating an example of functionalities performed using the components of the networked environment of FIG. 1 for distributed ledger-based hybrid quantum machine learning ransomware security according to various embodiments of the present disclosure.

FIG. 2 is a drawing illustrating an example of functionalities performed using the components of the networked environment 100. This figure shows how the hybrid quantum ransomware detection application 115 processes a file 203 according to a ransomware security automated contract 131. Generally, the hybrid quantum ransomware detection application 115 identifies a file 203, performs hybrid quantum ransomware detection using a hybrid quantum machine learning engine to produce a Boolean output that indicates whether ransomware has been identified in the file 203.

The hybrid quantum ransomware detection application 115 can receive or identify a file 203 for ransomware detection. In some examples, instructions executed using a client device 106 or a production computing environment 101 device can identify that a file 203 corresponds to a type of file 203 that should be tested for ransomware. A production computing environment 101 device can include a router or another networking device, or a physical or virtualized computing device. The ransomware security automated contract 131 can cause the instructions, such as the ransomware security service 124 and the ransomware security client application 143, to trigger a scan of a file 203 according to ransomware detection rules of the ransomware security automated contract 131.

The ransomware security automated contract 131 can use a network service 111 to periodically update the ransomware detection rules in view of developing threats and file characteristics associated with those threats. The ransomware detection rules can indicate to scan files received over a network 120 or a local interface, files moved into a predetermined memory location, files generated (for example, by a predetermined set of applications), and so on. The ransomware detection rules can also indicate a type of the file such as one or more predetermined file extensions, file size information, and so on. The ransomware detection rules can also indicate to scan a predetermined set of datastores or memory areas. The file 203 can correspond to a file that is identified for ransomware detection according to the ransomware detection rules specified in the ransomware security automated contract 131.

The input data processing 206 of the hybrid quantum ransomware detection application 115 can perform input data processing 206. The input data processing 206 can be one of the processing components 153 executed using the digital computing environment 117 (see FIG. 1). The input data processing 206 can convert the file 203 into an image data format. This conversion can include reformatting the file 203 from its original data format and file type to an image data format and file type. In one examples, the file 203 can be an executable file and/or a file that includes executable code, and can have a file extension such as .exe, .bat, .com, .wsf, .bin, .apk, .jar, .coff, .pe, .elf, or another file extension. The file 203 can include binary code that has been compiled from source code.

The input data processing 206 can convert the file 203 from an executable file into an image file, for example, by converting the binary data of the file 203 into a bitmap or raster image. The bitmap or raster image can include an array of floating-point numbers corresponding to cells or pixels in one or more rows and one or more columns. The bitmap or raster image can include data that includes a certain number of bits for each pixel, such as 8 bits per pixel, 16 bits per pixel, 24 bits per pixel, 32 bits per pixel, depending on the target image data format. In some examples, all or a subset of the binary bits from the file 203 can be segmented into a number of sections according to the number of bits for each pixel in the target image format. The sections of binary data from the file 203 can be converted into pixels. Other types of conversions can also be performed. The resulting image file can have a file extension such as .tiff, .bmp, .png, or another extension.

The image data can be provided as input for the convolutional neural network 155. The convolutional neural network 155 can be performed using the digital computing environment 117. The convolutional neural network 155 can perform convolution by processing the input image data using a kernel or filter component, which can refer to a matrix of weights. In some examples, the weights can be learned during a training process that involves training using a training set of ground truth ransomware files and corresponding ground truth values for: outputs from the convolutional neural network 155, outputs from the variational quantum circuit machine learning engine 151, a probability generated by an output neural network 157, and Boolean output. At each position, the filter component can compute a dot product between its weights and the values in the local region of the input image data. Applying the filter across the input image data can forms a feature map, which can be a matrix structure. In some examples, multiple different filters can be applied to produce multiple different feature maps. Additional layers with additional functions can also be performed by the convolutional neural network 155.

The resulting feature map or feature maps can be provided to digital to quantum interface 209. This intermediate processing component 153 can transmit or otherwise provide the feature maps to the variational quantum circuit machine learning engine 151. The digital to quantum interface 209 can provide a communications pathway between the digital computing environment 117 and the quantum computing environment 119 and can convert the feature maps to a format appropriate for the quantum computing environment 119 and the variational quantum circuit machine learning engine 151.

The variational quantum circuit machine learning engine 151 can be a trained machine learning engine that is trained using the training set of ground truth ransomware files and corresponding ground truth values for: outputs from the convolutional neural network 155, outputs from the variational quantum circuit machine learning engine 151, a probability generated by an output neural network 157, and Boolean output. The variational quantum circuit machine learning engine 151 can include a variational quantum algorithm that includes a number of variational quantum circuits. Variational quantum circuits can include gates with adjustable parameters for various quantum operations that the variational quantum circuit machine learning engine 151 can optimize during training.

The variational quantum circuit machine learning engine 151 can provide quantum-based output data to the quantum to digital interface 212. The quantum-based output data can be referred to as quantum-based since the variational quantum circuit machine learning engine 151 uses the quantum computing environment and quantum circuits and algorithms to produce its output data, even if the data is converted to a digital value thereafter. The quantum to digital interface 212 can be considered an intermediate processing component 153 and can transmit or otherwise provide the quantum-based output data from the variational quantum circuit machine learning engine 151 to the output neural networks 157. The quantum to digital interface 212 can provide a communications pathway between the quantum computing environment 119 and the digital computing environment 117. The quantum to digital interface 212 can convert the quantum-based output data to a format appropriate for the digital computing environment 117 and the output neural network 157.

The output neural networks 157 can take the quantum-based output data from the variational quantum circuit machine learning engine 151 as an input. The output neural network 157 can process this data into a probability value that indicates a probability that the file under test includes ransomware. The output processing component 215 can convert the probability to a Boolean output. For example, the output rules can indicate a threshold probability value. If the probability value is greater than (or equal to) the threshold probability value, then the Boolean output can indicate that the file under test includes ransomware. Otherwise, the Boolean output can indicate that the file under test omits, excludes, or does not include ransomware. Alternatively, a final layer of the output neural network 157 can convert the probability value to a Boolean output that can indicate whether the file under test includes ransomware. The output from the hybrid quantum ransomware detection application 115 can include at least one of a probability, a Boolean value, or any combination thereof.

The hybrid quantum ransomware detection application 115 can use the Boolean output to determine an action to perform. For example, if the Boolean output indicates that the file 203 is benign or does not include ransomware, the hybrid quantum ransomware detection application 115 can transmit, store, or otherwise enable access to the file 203.

Otherwise, if the Boolean output indicates that the file 203 is malicious, then the hybrid quantum ransomware detection application 115 can transmit a notification to an alert system. Other actions can include storing the file 203, disabling access to the file 203, quarantining the file 203, deleting the file 203, triggering a scan operation, triggering a backup operation, triggering a restore operation, and so on.

Figure 3:
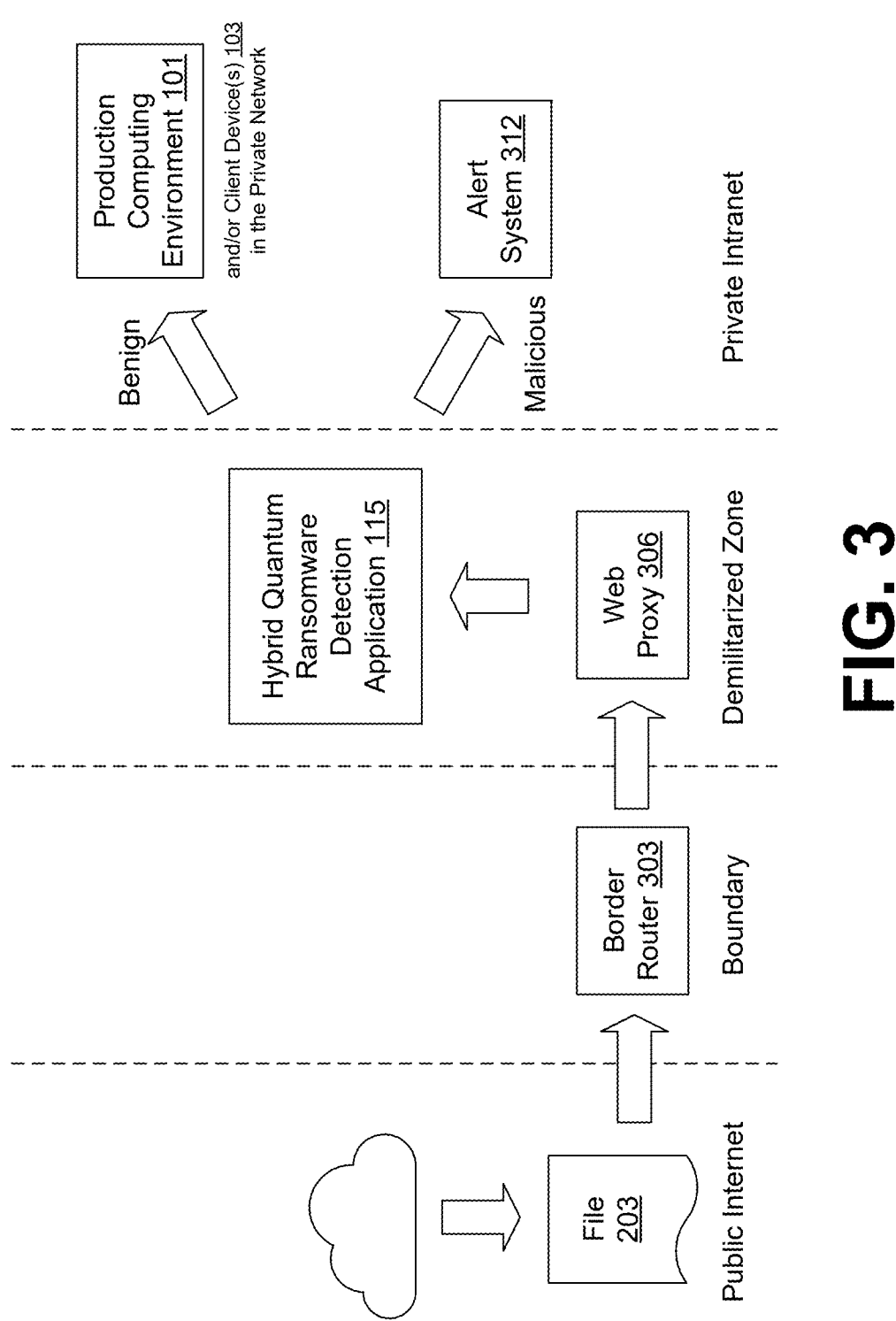
FIG. 3 is a drawing illustrating another example of functionalities performed using the components of the networked environment of FIG. 1 for distributed ledger-based hybrid quantum machine learning ransomware security according to various embodiments of the present disclosure.

FIG. 3 shows components of the networked environment 100 of FIG. 1 performing distributed ledger-based hybrid quantum machine learning ransomware security functionalities. This figure shows how the various components work in concert to protect a private LAN or private Intranet from ransomware. This can include protecting a production computing environment 101 and/or client devices 103 in the private Intranet from ransomware in files 203 that are transmitted through a border router 303.

The border router 303 can receive one or more data packets corresponding to a file 203. The border router 303 can provide a border between a private intranet or LAN and a public WAN such as the Internet. The data packets can be addressed to a computing device of the production computing environment 101 or a client device 103 in the private intranet. The border router 303 can include an agent or other instructions that intercept files 203 that correspond to file characteristics specified in a ransomware security automated contract 131. In some examples, the border router 303 can be considered a portion of the production computing environment 101 and can execute at least a portion of the ransomware security service 124.

The border router 303 can identify that the file 203 corresponds to file characteristics specified in a ransomware security automated contract 131 and can divert the file 203 to the hybrid quantum ransomware detection application 115 for ransomware detection. The hybrid quantum ransomware detection application 115 can use digital and quantum components and computing environments to identify whether the file 203 includes ransomware.

The hybrid quantum ransomware detection application 115 can operate as indicated in FIG. 2. The hybrid quantum ransomware detection application 115 can convert the file 203 into image data, process the image data using a convolutional neural network 155 in a digital computing environment 117, process a resulting feature map using the variational quantum circuit machine learning engine 151 in a quantum computing environment 119, process the output from the variational quantum circuit machine learning engine 151 to identify whether the file 203 includes ransomware.

If the variational quantum circuit machine learning engine 151 indicates that the file 203 is benign, the hybrid quantum ransomware detection application 115 can transmit, store, or otherwise enable access to the file 203 in the production computing environment 101 and/or the client devices 103. Otherwise, if the variational quantum circuit machine learning engine 151 indicates that the file 203 is malicious, then the hybrid quantum ransomware detection application 115 can transmit a notification to an alert system 312. If a user requested access to the file 203, then the hybrid quantum ransomware detection application 115 or the alert system 312 can provide a user interface that indicates that the file 203 has been identified to include ransomware, and that the file 203 will not be provided for access. In some examples the file 203 can be deleted or otherwise destroyed.

The hybrid quantum ransomware detection application 115 can also transmit one or more of the file 203, an origin or source network address of the file 203, information about the file such as a file name and file size, or any combination thereof, to the alert system 312. The alert system 312 can use this data to transmit a command to quarantine files on the client devices 106 (and/or throughout a production computing environment 101) that correspond to the file name and file size, or any combination thereof, until individual scans can be performed.

Figure 4:
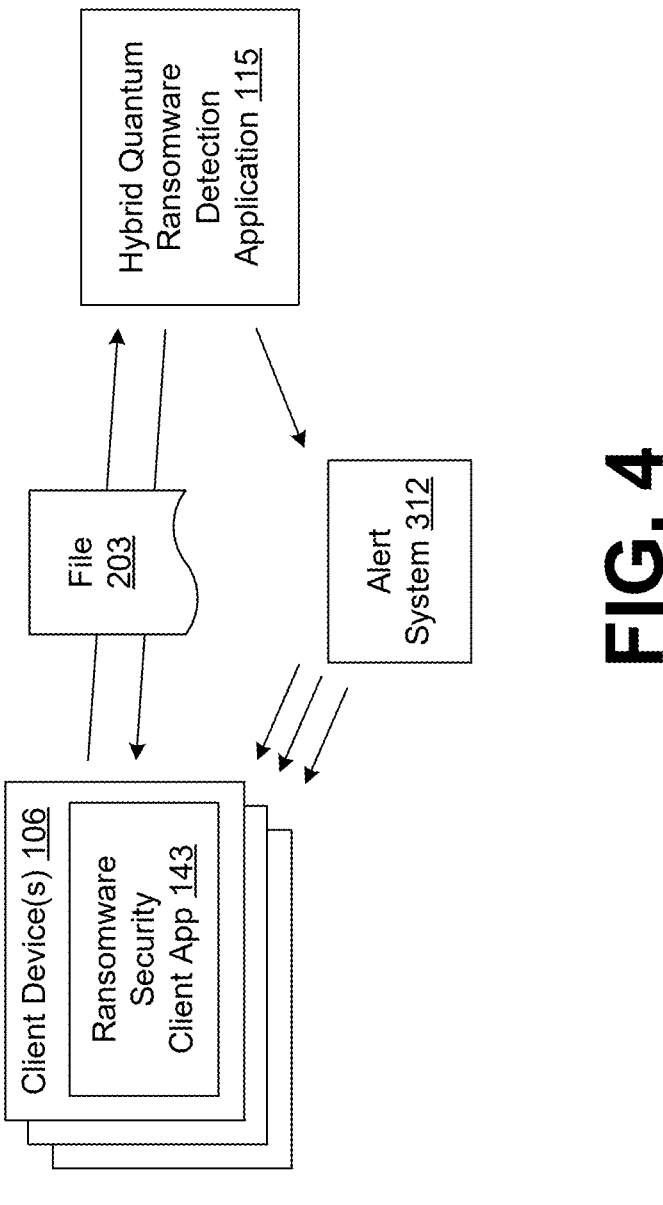
FIG. 4 is a drawing illustrating another example of functionalities performed using the components of the networked environment of FIG. 1 for distributed ledger-based hybrid quantum machine learning ransomware security according to various embodiments of the present disclosure.

FIG. 4 shows components of the networked environment 100 of FIG. 1 performing distributed ledger-based hybrid quantum machine learning ransomware security functionalities. This figure shows how the various components work in concert to protect client devices 106 from ransomware. This can include protecting the client devices 103 from ransomware in files 203 regardless of the network to which they are connected.

The ransomware security client application 143 can provide ransomware security for the client device 106 in association with the hybrid quantum ransomware detection application 115 and the ransomware security automated contract 131. The ransomware security client application 143 can scan a predetermined subset of the files, memory locations, and applications on the client application 143 as specified in the ransomware security automated contract 131. The subset of files, memory locations, and applications that are specified to be scanned can change periodically based at least in part on developing ransomware threats identified by a network service 111 and administrative user selections through a user interface of the ransomware security automated contract 131 or an associated distributed application.

The ransomware security client application 143 can identify that a file 203 corresponding to a specified ransomware detection trigger has been received, generated, or identified in a scan. The ransomware detection trigger can indicate file characteristics specified in a ransomware security automated contract 131. The ransomware security client application 143 can transmit the file 203 to the hybrid quantum ransomware detection application 115.

The hybrid quantum ransomware detection application 115 can convert the file 203 into image data, process the image data using a convolutional neural network 155 in a digital computing environment 117, process a resulting feature map using the variational quantum circuit machine learning engine 151 in a quantum computing environment 119, process the output from the variational quantum circuit machine learning engine 151 to identify whether the file 203 includes ransomware.

If the variational quantum circuit machine learning engine 151 indicates that the file 203 is benign, the hybrid quantum ransomware detection application 115 can return an indication that the file 203 can be stored, remain stored, or otherwise that the file 203 can be accessed and utilized on the client device 106. If the variational quantum circuit machine learning engine 151 indicates that the file 203 is malicious, then the hybrid quantum ransomware detection application 115 can transmit a notification to an alert system 312 and return to the client device 106 an indication that the file 203 is to be quarantined, deleted, or otherwise not accessed or utilized on the client device 106.

The hybrid quantum ransomware detection application 115 or the alert system 312 can provide a user interface that indicates that the file 203 has been identified to include ransomware, and that the file 203 is quarantined, deleted, or otherwise not accessed or utilized on the client device 106. The hybrid quantum ransomware detection application 115 can also transmit one or more of the file 203, an origin or source network address of the file 203, information about the file 203 such as a file name and file size, or any combination thereof, to the alert system 312. In some cases, the alert system 312 can use this data to transmit a command to quarantine files on the client devices 106 (and/or throughout a production computing environment 101) that correspond to the file name and file size, or any combination thereof, until individual scans can be performed.

Figure 5:
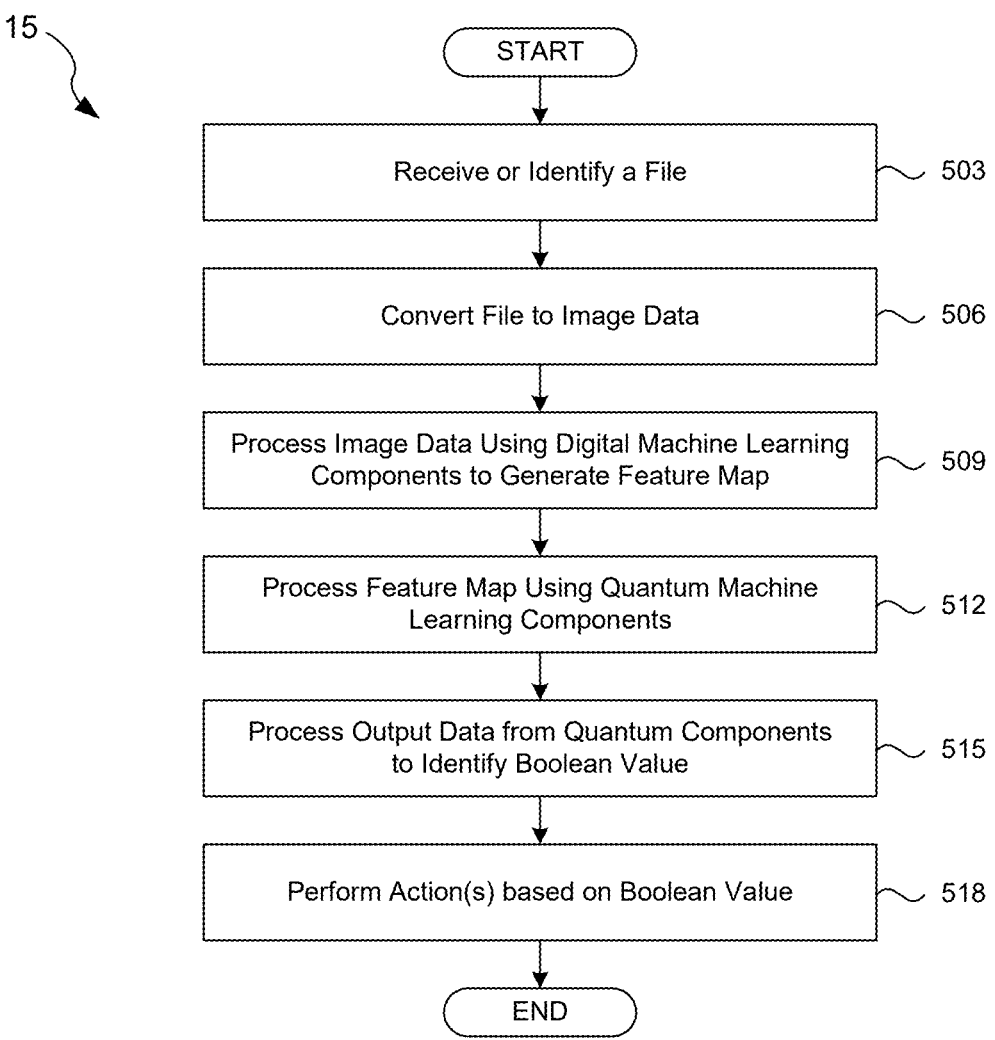
FIG. 5 is a flowchart illustrating functionalities performed by a hybrid quantum ransomware detection application according to various embodiments of the present disclosure.

FIG. 5 shows a flowchart that provides an example of how the hybrid quantum ransomware detection application 115 processes a file to identify whether it includes ransomware. The flowchart of FIG. 5 provides merely an example of the many different types of functional arrangements that can be employed to implement the depicted interactions between the components of the networked environment 100. The flowchart of FIG. 5 can be viewed as depicting an example of elements of a method implemented within the networked environment 100.

In block 503, the hybrid quantum ransomware detection application 115 can receive or identify a file 203 for ransomware detection. In some examples, instructions executed using a client device 106 or a production computing environment 101 device can identify that a file 203 corresponds to a type of file 203 that should be tested for ransomware. A production computing environment 101 device can include a router or another networking device, or a physical or virtualized computing device. The ransomware security automated contract 131 can cause the instructions, such as the ransomware security service 124 and the ransomware security client application 143, to trigger a scan of a file 203 according to ransomware detection rules of the ransomware security automated contract 131. In some examples, the ransomware security automated contract 131 can use a network service 111 to periodically update the ransomware detection rules in view of developing threats and file characteristics associated with those threats. The ransomware detection rules can indicate to scan files received over a network 120 or a local interface, files moved into a predetermined memory location, files generated (for example, by a predetermined set of applications), and so on. The ransomware detection rules can also indicate a type of the file such as one or more predetermined file extensions, file size information, and so on. The ransomware detection rules can also indicate to scan a predetermined set of datastores or memory areas. The file 203 can correspond to a file that is identified for ransomware detection according to the ransomware detection rules specified in the ransomware security automated contract 131.

In block 506, the hybrid quantum ransomware detection application 115 can convert the file 203 into an image data format. This conversion can include reformatting the file 203 from its original data format and file type to an image data format and file type. In one example, the file 203 can be an executable file and/or a file that includes executable code. The file 203 can include binary code that has been compiled from source code.

The hybrid quantum ransomware detection application 115 can convert the file 203 from an executable file (or package file, etc.), by converting binary data of the file 203 into a bitmap or raster image. The bitmap or raster image can include an array of floating-point numbers corresponding to cells or pixels in one or more rows and one or more columns. The bitmap or raster image can include data that includes a certain number of bits for each pixel, such as 8 bits per pixel, 16 bits per pixel, 24 bits per pixel, 32 bits per pixel, depending on the target image data format. In some examples, all or a subset of the binary bits from the file 203 can be segmented into a number of sections according to the number of bits for each pixel in the target image format. The sections of binary data from the file 203 can be converted into pixels.

In block 509, the hybrid quantum ransomware detection application 115 can process the image data using digital machine learning components to generate one or more feature map. The digital machine learning components that generate the feature map can refer to the convolutional neural network 155 executed using the digital computing environment 117. The convolutional neural network 155 can perform convolution by processing the input image data using a kernel or filter component, which can refer to a matrix of weights. At each position, the filter component can compute a dot product between its weights and the values in the local region of the input image data. Applying the filter across the input image data can forms a feature map, which can be a matrix structure. In some examples, multiple different filters can be applied to produce multiple different feature maps. Additional layers with additional functions can also be performed by the convolutional neural network 155.

In block 512, the hybrid quantum ransomware detection application 115 can process the feature map or feature maps using quantum machine learning components. The quantum machine learning components can include the variational quantum circuit machine learning engine 151. The hybrid quantum ransomware detection application 115 can include a digital to quantum interface that provides a communications pathway between the digital computing environment 117 and the quantum computing environment 119. The hybrid quantum ransomware detection application 115 can invoke or otherwise cause the interface to convert the feature maps to an appropriate format appropriate for the quantum computing environment 119 and provide the data to the variational quantum circuit machine learning engine 151.

The variational quantum circuit machine learning engine 151 can include a variational quantum algorithm that includes a number of variational quantum circuits. Variational quantum circuits can include gates with adjustable parameters for various quantum operations that the variational quantum circuit machine learning engine 151 can optimize during training. The variational quantum circuit machine learning engine 151 can provide quantum-based output data to a quantum to digital interface. The quantum to digital interface can convert the variational quantum circuit machine learning engine output data to a format appropriate for the digital computing environment 117 and the output neural network 157.

In block 515, the hybrid quantum ransomware detection application 115 can receive the quantum-based output data and process it using the output neural networks 157. The output neural network 157 can process this data to generate a probability value that indicates a probability that the file under test includes ransomware. The hybrid quantum ransomware detection application 115 can convert the probability to a Boolean output that indicates whether the file under test includes ransomware. The output from the hybrid quantum ransomware detection application 115 can include at least one of a probability, a Boolean value, or any combination thereof.

In block 518, the hybrid quantum ransomware detection application 115 can use the Boolean output to determine an action to perform. For example, if the Boolean output indicates that the file 203 is benign or does not include ransomware, the hybrid quantum ransomware detection application 115 can transmit, store, or otherwise enable access to the file 203. Otherwise, if the Boolean output indicates that the file 203 is malicious, then the hybrid quantum ransomware detection application 115 can transmit a notification to an alert system. Other actions can include storing the file 203, disabling access to the file 203, quarantining the file 203, deleting the file 203, triggering a scan operation, triggering a backup operation, triggering a restore operation, and so on.

Figure 6:
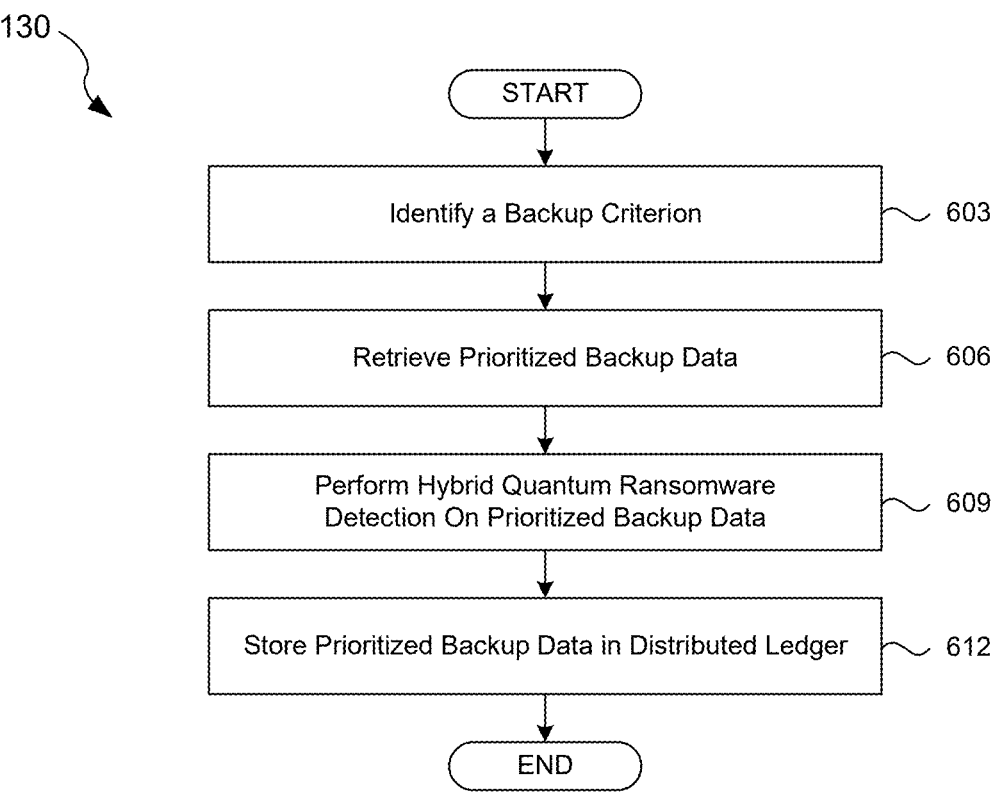
FIG. 6 is a flowchart illustrating functionalities performed by a ransomware security automated contract for distributed ledger-based hybrid quantum machine learning ransomware security according to various embodiments of the present disclosure.

FIG. 6 shows a flowchart that provides an example of how the ransomware security automated contract 131 performs a distributed ledger-based backup process. The flowchart of FIG. 6 provides merely an example of the many different types of functional arrangements that can be employed to implement the depicted interactions between the components of the networked environment 100. The flowchart of FIG. 6 can be viewed as depicting an example of elements of a method implemented within the networked environment 100.

In block 603, the ransomware security automated contract 131 can identify a backup criterion to perform a backup process. The backup criterion can include instructions in the ransomware security automated contract 131 to store prioritized backup data 134 periodically, on a schedule, or on demand (e.g., from an administrative user using a user interface provided using the ransomware security automated contract 131 or a related distributed application). The backup criterion can include receiving a request from the ransomware security service 124 and/or the ransomware security client application 143. The ransomware security service 124 and/or the ransomware security client application 143 can trigger backups in an automated fashion based at least in part on events and conditions detected on the production computing environment 101 and/or the client device 106. The ransomware security service 124 and/or the ransomware security client application 143 can detect an update to a particular subset of the prioritized backup data 134. For example, the ransomware security service 124 and/or the ransomware security client application 143 can detect an update to cryptographic data such as cryptographic keys, certificates, digital signatures, hash values, salts, and so on. The ransomware security service 124 and/or the ransomware security client application 143 can transmit a request to the ransomware security automated contract 131 that triggers the backup action.

In block 606, the ransomware security automated contract 131 can retrieve prioritized backup data 134 from one or more of the client devices 106, the production computing environment 101, or any combination thereof. The ransomware security automated contract 131 can identify a most recent specification of the prioritized backup data 134. The specification of the prioritized backup data 134 can indicate types of data, data locations, and other characteristics of the prioritized backup data 134.

The ransomware security automated contract 131 can transmit a prioritized backup data request that includes the specification of the prioritized backup data 134. The prioritized backup data request can be transmitted to one or more of the client devices 106, the production computing environment 101, or any combination thereof. One or more of the client devices 106, the production computing environment 101, or any combination thereof can return the specified prioritized backup data 134. The ransomware security service 124, the ransomware security client application 143 or any combination thereof, can process the prioritized backup data request and return the specified prioritized backup data 134 by transmitting the data over a network 120.

The backup action can be an incremental backup that reduces the amount of data transmitted and stored in the distributed ledgers 132. The ransomware security service 124, the ransomware security client application 143 or any combination thereof, can perform the incremental backup by identifying differences between a data state at a previous backup event, and limiting the prioritized backup data 134 to data that has changed since the previous backup event, thereby conserving network bandwidth, backup time, and storage space in the distributed ledgers 132.

In block 609, the ransomware security automated contract 131 can provide the prioritized backup data 134 to the hybrid quantum ransomware detection application 115. This can ensure that the prioritized backup data 134 is free from ransomware threats. The hybrid quantum ransomware detection application 115 can perform a ransomware detection process (see, e.g., FIG. 5) on each file of the prioritized backup data 134. If the prioritized backup data 134 is free of ransomware, then the ransomware security automated contract 131 can proceed to block 612. However, if the prioritized backup data 134 includes ransomware, then another action can be triggered such as a restore action (see, e.g., FIG. 7), a deletion action, a quarantine action, or another action.

In block 612, the ransomware security automated contract 131 can store the prioritized backup data 134 in the distributed ledger 132. The distributed ledger 132 can provide an immutable restoration record for the prioritized backup data 134. Since the prioritized backup data 134 has been processed hybrid quantum ransomware detection application 115, the prioritized backup data 134 can be ensured to be free from ransomware.

Figure 7:
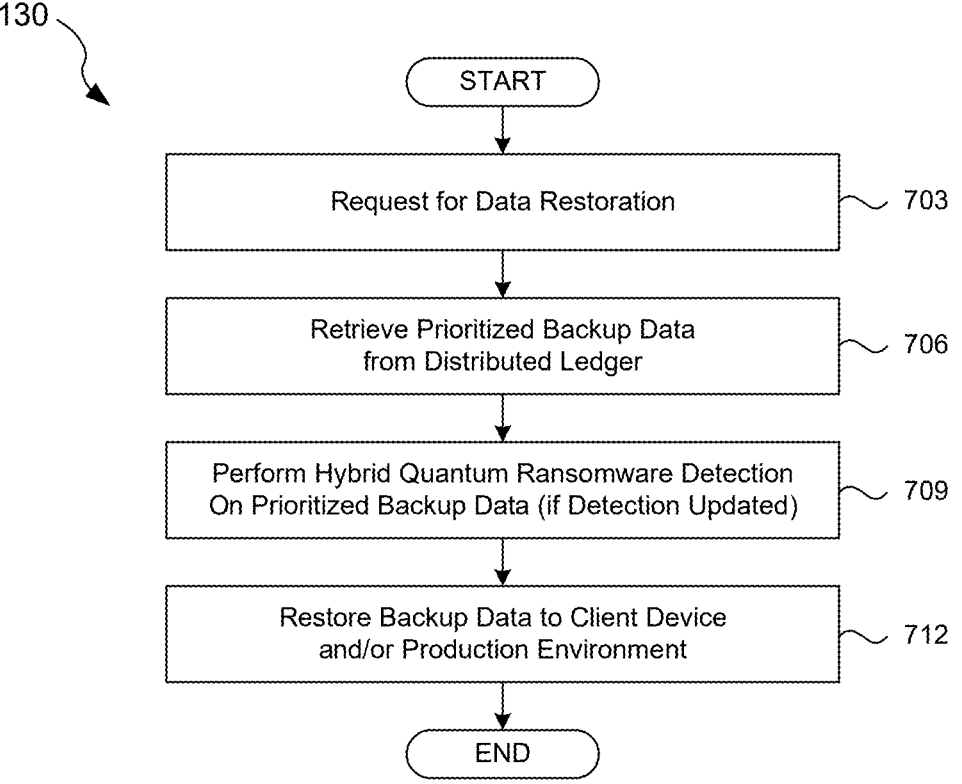
FIG. 7 is a flowchart illustrating additional functionalities performed by a ransomware security automated contract for distributed ledger-based hybrid quantum machine learning ransomware security according to various embodiments of the present disclosure.

FIG. 7 shows a flowchart that provides an example of how the ransomware security automated contract 131 performs a distributed ledger-based data restoration process. The flowchart of FIG. 7 provides merely an example of the many different types of functional arrangements that can be employed to implement the depicted interactions between the components of the networked environment 100. The flowchart of FIG. 7 can be viewed as depicting an example of elements of a method implemented within the networked environment 100.

In block 703, the ransomware security automated contract 131 can receive a request for data restoration. A user of a client device 106 or a device of the production computing environment 101 can request data restoration on demand, for example, by selecting a user interface element provided using the ransomware security automated contract 131 or an associated distributed application. The hybrid quantum ransomware detection application 115 can request data restoration based at least in part on the results of a ransomware detection process. For example, the hybrid quantum ransomware detection application 115 can request data restoration based at least in part on identification that a file 203 include ransomware.

In block 706, the ransomware security automated contract 131 can retrieve prioritized backup data 134. The ransomware security automated contract 131 can request prioritized backup data 134 from the distributed ledger 132. The distributed ledger 132 can provide an immutable restoration record for the prioritized backup data 134.

In block 709, the ransomware security automated contract 131 can provide the prioritized backup data 134 to the hybrid quantum ransomware detection application 115. This can ensure that the restored prioritized backup data 134 is free from ransomware threats. If the hybrid quantum ransomware detection application 115 has been retrained to detect new items of ransomware since a date of the prioritized backup data 134 retrieved in block 706, then the ransomware security automated contract 131 can provide the prioritized backup data 134 to the hybrid quantum ransomware detection application 115 for ransomware detection using the retrained models. For example, the ransomware security automated contract 131 can determine that a training date of the hybrid quantum ransomware detection application 115 is more recent than a storage date corresponding to storage of the prioritized backup data to the distributed ledger 132. Training of the hybrid quantum ransomware detection application 115 can include individually and/or collectively training the machine learning components of the hybrid quantum ransomware detection application 115. The machine learning components of the hybrid quantum ransomware detection application 115 can include the variational quantum circuit machine learning engine 151, the convolutional neural networks 155, and the output neural networks 157.

The hybrid quantum ransomware detection application 115 can perform a ransomware detection process (see, e.g., FIG. 5) on each file of the prioritized backup data 134. If the prioritized backup data 134 is free of ransomware, then the ransomware security automated contract 131 can proceed to block 712. However, if the prioritized backup data 134 includes ransomware, then another action can be triggered such as another restore action (e.g., to an earlier date), an indication to store to the distributed ledger 132 instructions indicating not to use the blocks or records in the distributed ledger or blockchain that include ransomware, or another action. Since the prioritized backup data 134 is stored using an incremental backup framework, the restoration action can reduce the amount of data transmitted for restoration actions.

In block 712, the ransomware security automated contract 131 can transmit the prioritized backup data 134. The ransomware security automated contract 131 can transmit a prioritized backup data storage command that includes the prioritized backup data 134. The ransomware security automated contract 131 can transmit the restoration command to one or more of the client device 106, the production computing environment 101, or any combination thereof. The ransomware security service 124, the ransomware security client application 143 or any combination thereof, can process the prioritized backup data restoration command and restore the prioritized backup data 134.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages could be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or any combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:

at least one computing device comprising at least one processor and at least one memory; and machine-readable instructions stored in the at least one memory that, when executed by the at least one processor, cause the at least one computing device to at least:

convert a file into image data based at least in part on reformatting a particular data format of the file to an image data format;

process the image data using a convolutional neural network that generates at least one feature map;

provide the at least one feature map to a variational quantum circuit machine learning engine; and perform at least one action based at least in part on an output from the variational quantum circuit machine learning engine.

2. The system of claim 1, wherein the variational quantum circuit machine learning engine and the convolutional neural network are components of a hybrid quantum ransomware detection application that utilizes a digital computing environment and a quantum computing environment to perform the ransomware detection process.

3. The system of claim 1, wherein the file is an executable file comprising a binary data format, and the file is converted based at least in part on reformatting the binary data format to the image data format.

4. The system of claim 1, wherein the machine-readable instructions, when executed by the at least one processor, further cause the at least one computing device to at least:

process data from the variational quantum circuit machine learning engine using a neural network that provides at least one probability indicating whether the file includes ransomware.

5. The system of claim 1, wherein the machine-readable instructions, when executed by the at least one processor, further cause the at least one computing device to at least:

determine that at least one file characteristic specified in a ransomware security automated contract executed in a distributed ledger environment indicates that the file is to be examined for ransomware.

6. The system of claim 1, wherein the ransomware detection process is determined to be performed on a file based at least in part on at least one rule specified in a ransomware security automated contract executed in a distributed ledger environment.

7. A non-transitory, computer-readable medium comprising machine-readable instructions that, when executed by at least one processor of a computing device, cause the at least one computing device to at least:

convert a file into image data based at least in part on reformatting a particular data format of the file to an image data format;

process the image data using a convolutional neural network that generates at least one feature map;

provide the at least one feature map to a variational quantum circuit machine learning engine; and perform at least one action based at least in part on an output from the variational quantum circuit machine learning engine.

8. The non-transitory, computer-readable medium of claim 7, wherein the variational quantum circuit machine learning engine and the convolutional neural network are components of a hybrid quantum ransomware detection application that utilizes a digital computing environment and a quantum computing environment to perform the ransomware detection process.

9. The non-transitory, computer-readable medium of claim 7, wherein the file is an executable file comprising a binary data format, and the file is converted based at least in part on reformatting the binary data format to the image data format.

10. The non-transitory, computer-readable medium of claim 7, wherein the machine-readable instructions, when executed by the at least one processor, further cause the at least one computing device to at least:

process data from the variational quantum circuit machine learning engine using a neural network that provides at least one probability indicating whether the file includes ransomware.

11. The non-transitory, computer-readable medium of claim 7, wherein the machine-readable instructions, when executed by the at least one processor, further cause the at least one computing device to at least:

determine that at least one file characteristic specified in a ransomware security automated contract executed in a distributed ledger environment indicates that the file is to be examined for ransomware.

12. The non-transitory, computer-readable medium of claim 7, wherein the ransomware detection process is determined to be performed on a file based at least in part on at least one rule specified in a ransomware security automated contract executed in a distributed ledger environment.

13. A method, comprising:

converting a file into image data based at least in part on reformatting a particular data format of the file to an image data format;

processing the image data using a convolutional neural network that generates at least one feature map;

providing the at least one feature map to a variational quantum circuit machine learning engine; and performing at least one action based at least in part on an output from the variational quantum circuit machine learning engine.

14. The method of claim 13, wherein the variational quantum circuit machine learning engine and the convolutional neural network are components of a hybrid quantum ransomware detection application that utilizes a digital computing environment and a quantum computing environment to perform the ransomware detection process.

15. The method of claim 13, wherein the file is an executable file comprising a binary data format, and the file is converted based at least in part on reformatting the binary data format to the image data format.

16. The method of claim 13, further comprising processing data from the variational quantum circuit machine learning engine using a neural network that provides at least one probability indicating whether the file includes ransomware.

17. The method of claim 13, further comprising determining that at least one file characteristic specified in a ransomware security automated contract executed in a distributed ledger environment indicates that the file is to be examined for ransomware.

18. The method of claim 13 wherein the ransomware detection process is determined to be performed on a file based at least in part on at least one rule specified in a ransomware security automated contract executed in a distributed ledger environment.

\* \* \* \* \*